US011250129B2

(12) United States Patent
Slipenchuk et al.

(10) Patent No.: US 11,250,129 B2
(45) Date of Patent: Feb. 15, 2022

(54) METHOD AND SYSTEM FOR DETERMINING AFFILIATION OF SOFTWARE TO SOFTWARE FAMILIES

(71) Applicant: Group IB TDS, Ltd, Moscow (RU)

(72) Inventors: Pavel Vladimirovich Slipenchuk, Moscow (RU); Ilia Sergeevich Pomerantsev, Moscow Region (RU)

(73) Assignee: GROUP IB TDS, LTD, Moscow (RU)

( * ) Notice: Subject to any disclaimer, the term of this patent is extended or adjusted under 35 U.S.C. 154(b) by 0 days.

(21) Appl. No.: 17/087,775

(22) Filed: Nov. 3, 2020

(65) Prior Publication Data

US 2021/0173927 A1    Jun. 10, 2021

(30) Foreign Application Priority Data

Dec. 5, 2019    (RU) .......................... RU2019139628

(51) Int. Cl.
*G06F 21/56* (2013.01)
*G06F 21/55* (2013.01)
(Continued)

(52) U.S. Cl.
CPC ............ *G06F 21/563* (2013.01); *G06F 21/14* (2013.01); *G06F 21/554* (2013.01); *G06F 21/568* (2013.01); *G06F 21/602* (2013.01)

(58) Field of Classification Search
CPC ...... G06F 21/563; G06F 21/14; G06F 21/554; G06F 21/568; G06F 21/602; G06F 21/566; G06F 8/74; G06F 8/433; G06F 8/75
See application file for complete search history.

(56) References Cited

U.S. PATENT DOCUMENTS 7,225,343 B1    5/2007  Honig et al.
7,383,581 B1    6/2008  Moore et al.
(Continued)

FOREIGN PATENT DOCUMENTS

AU    2017203008 B2    3/2019
CN      103491205 A    1/2014
(Continued)

OTHER PUBLICATIONS

Grant Decision with regard to the counterpart RU Patent Application No. 2019139630 dated Jun. 26, 2020.
(Continued)

*Primary Examiner* — Nelson S. Giddins
(74) *Attorney, Agent, or Firm* — BCF LLP

(57) ABSTRACT

A method and a system for determining an affiliation of a given software with target software are provided. The method comprises: receiving a file including a machine code associated with the given software; determining a file format; identifying, based on the file format, in the machine code, at least one function of a plurality of functions; generating, for each one of the plurality of functions associated with the given software, a respective function identifier; aggregating respective function identifiers, thereby generating an aggregated array of function identifiers associated with the given software; applying at least one classifier to the aggregated array of function identifiers to determine a likelihood parameter indicative of the given software being affiliated to a respective target software; in response to the likelihood parameter being equal to or greater than a predetermined likelihood parameter threshold: identifying the given software as being affiliated to the respective target software.

22 Claims, 4 Drawing Sheets

(51) Int. Cl.
*G06F 21/14* (2013.01)
*G06F 21/60* (2013.01)

(56) References Cited

U.S. PATENT DOCUMENTS

| | | |
|---|---|---|
| 7,496,628 B2 | 2/2009 | Arnold et al. |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,683,595 B1 | 3/2014 | Barker |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,165,142 B1 | 10/2015 | Sanders et al. |
| 9,210,111 B2 | 12/2015 | Chasin et al. |
| 9,215,239 B1 | 12/2015 | Wang et al. |
| 9,223,972 B1 * | 12/2015 | Vincent ............... G06F 21/566 |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 10,148,685 B2 | 12/2018 | Hassanzadeh et al. |
| 10,284,574 B1 | 5/2019 | Aziz et al. |
| 10,467,411 B1 | 11/2019 | Pidathala et al. |
| 2002/0161862 A1 | 10/2002 | Horvitz |
| 2003/0009696 A1 | 1/2003 | Bunker et al. |
| 2006/0021029 A1 | 1/2006 | Brickell et al. |
| 2006/0037080 A1 | 2/2006 | Maloof |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0239999 A1 | 10/2007 | Honig et al. |
| 2008/0172651 A1 | 7/2008 | Davia |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0227691 A1 | 8/2013 | Aziz et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0170312 A1 | 6/2015 | Mehta et al. |
| 2015/0178306 A1 | 6/2015 | Yang et al. |
| 2015/0200963 A1 | 7/2015 | Geng et al. |
| 2015/0220735 A1 | 8/2015 | Paithane et al. |
| 2015/0227364 A1 | 8/2015 | Asadullah et al. |
| 2015/0295945 A1 | 10/2015 | Canzanese et al. |
| 2015/0356291 A1 | 12/2015 | Zakorzhevsky et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127388 A1 | 5/2016 | Cabot et al. |
| 2016/0127907 A1 | 5/2016 | Baxley et al. |
| 2016/0149943 A1 | 5/2016 | Kaloroumakis et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0359679 A1 | 12/2016 | Parandehgheibi et al. |
| 2017/0006045 A1 | 1/2017 | Kiwa et al. |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0251003 A1 | 8/2017 | Rostami-Hesarsorkh et al. |
| 2017/0262633 A1 | 9/2017 | Miserendino et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |
| 2018/0096153 A1 | 4/2018 | Dewitte et al. |

(56) References Cited

U.S. PATENT DOCUMENTS

| | | | |
|---|---|---|---|
| 2018/0115573 A1 | 4/2018 | Kuo et al. | |
| 2018/0165452 A1 | 6/2018 | Sun et al. | |
| 2018/0268464 A1 | 9/2018 | Li | |
| 2018/0307832 A1 | 10/2018 | Ijiro et al. | |
| 2018/0309787 A1 | 10/2018 | Evron et al. | |
| 2018/0365420 A1 | 12/2018 | Krylov et al. | |
| 2019/0005239 A1 | 1/2019 | Park et al. | |
| 2019/0089737 A1 | 3/2019 | Shayevitz et al. | |
| 2019/0114423 A1 | 4/2019 | Chistyakov et al. | |
| 2019/0158525 A1 | 5/2019 | Rostami-Hesarsorkh et al. | |
| 2019/0207973 A1 | 7/2019 | Peng | |
| 2019/0230098 A1 | 7/2019 | Navarro | |
| 2019/0373005 A1 | 12/2019 | Bassett | |
| 2020/0092306 A1 | 3/2020 | Jusko et al. | |
| 2020/0134702 A1 | 4/2020 | Li | |
| 2020/0302058 A1* | 9/2020 | Kenyon | G06F 21/564 |

FOREIGN PATENT DOCUMENTS

| | | |
|---|---|---|
| CN | 104504307 A | 4/2015 |
| CN | 103020494 B | 6/2015 |
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392019 A | 11/2017 |
| CN | 107392456 A | 11/2017 |
| EP | 1160646 A2 | 12/2001 |
| EP | 2916256 A1 | 9/2015 |
| EP | 2410452 B1 | 1/2016 |
| EP | 2743854 B1 | 12/2018 |
| EP | 2946331 B1 | 8/2019 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2580036 C2 | 4/2016 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2654146 C1 | 5/2018 |
| RU | 2670906 C9 | 12/2018 |
| RU | 2681699 C1 | 3/2019 |
| RU | 2702269 C1 | 10/2019 |
| RU | 2706883 C1 | 11/2019 |
| RU | 2706896 C1 | 11/2019 |
| RU | 2708356 C1 | 12/2019 |
| RU | 2728497 C1 | 7/2020 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2017/111835 A1 | 6/2017 |
| WO | 2019/010182 A1 | 1/2019 |

OTHER PUBLICATIONS

Dauber et al., "Stylometric Authorship Attribution in Collaborative Documents", Materials of International Conference on Cyber Security Cryptography and Machine Learning (CSCML) 2017, pp. 115-135.

Afroz, Deception in Authorship Attribution, Drexel University, 2013, http://hdl.handle.net/1860/4431, pp. 1-91.

Granin, "Text Analyzer", https://habr.com/ru/post/114186/ and Machine Translation into English by Yandex Translate on Oct. 21, 2020, pdf 32 pages.

"Authorship Attribution Program by NeoNeuro", https://neoneuro.com accessed Jul. 31, 2020, pdf 5 pages.

"Tools for Software Analysis and Forensic Engineering, S.A.F.E.", https://www.safe-corp.com/index.htm accessed Jul. 31, 2020, pdf 2 pages.

English Abstract for CN 103020494 retrieved on Espacenet on Oct. 21, 2020.

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.

Wikipedia, "Blockchain", https://en.wikipedia.org/wiki/Blockchain, pdf document, 18 pages.

Search Report with regard to the counterpart RU Patent Application No. 2018101764 completed Jun. 29, 2018.

Search Report with regard to the counterpart RU Patent Application No. 2018101761 completed Jun. 20, 2018.

International Search Report with regard to the counterpart Patent Application No. PCT/RU2016/000526 dated Jun. 1, 2017.

Search Report with regard to the counterpart RU Patent Application No. 2018101760 completed Jun. 22, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 11, 2017.

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.

Search Report with regard to the counterpart Patent Application No. RU2018105377 completed Oct. 15, 2018.

Search Report with regard to the counterpart RU Patent Application No. 2018101763 completed Jan. 11, 2019.

Search Report with regard to the counterpart RU Patent Application No. 2016137336 completed Jun. 6, 2017.

English Abstract of RU2522019 retrieved on Espacenet on Jan. 25, 2019.

Search Report with regard to the counterpart RU Patent Application No. 2017140501 completed Jul. 11, 2018.

European Search Report with regard to the counterpart EP Patent Application No. EP17211131 completed Apr. 12, 2018.

European Search Report with regard to the counterpart EP Patent Application No. EP17210904 completed May 16, 2018.

Office Action with regard to the counterpart U.S. Appl. No. 15/707,641 dated Apr. 25, 2019.

English Translation of CN106713312, © Questel—FAMPAT, Jul. 17, 2019.

English Translation of CN105897714, © Questel—FAMPAT, Jul. 17, 2019.

(56) References Cited

OTHER PUBLICATIONS

English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Search Report with regard to the counterpart RU Patent Application No. 2018144708 completed Aug. 16, 2019.
English Translation of KR10-2007-0049514 (Description, Claims) retrieved on Espacenet on Oct. 16, 2019.
Search Report with regard to the counterpart RU Patent Application No. 2018147431 completed Aug. 15, 2019.
English Abstract of KR10-1514984 retrieved on Espacenet on Oct. 15, 2019.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 {Year 2005}.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet on Jan. 7, 2020.
English Abstract for CN104504307 retrieved on Espacenet on Jan. 7, 2020.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to the counterpart U.S. Appl. No. 16/270,341 dated May 27, 2020.
Notice of Allowance with regard to the counterpart U.S. Appl. No. 15/858,013 dated Jun. 10, 2020.
Office Action with regard to the counterpart U.S. Appl. No. 16/249,004 dated Apr. 23, 2021.
Grant Decision and Search Report with regard to the RU Patent Application No. 2019139628 completed Jun. 26, 2020.
Search Report with regard to the RU Patent Application No. 2020126232 completed Jan. 28, 2021.
Rudman et al., "Dridex: Analysis of the traffic and automatic generation of IOCs", IEEE, 2016, https://digifors.cs.up.ac.za/issa/2016/Proceedings/Full/paper%2041.pdf, pp. 77-84.
Github / Linguist, https://github.com/github/linguist accessed on Sep. 24, 2021, pdf 6 pages.
Blackducksoftware / Ohcount, https://github.com/blackducksoftware/ohcount accessed on Sep. 24, 2021, pdf 4 pages.
Search Report with regard to the NL Patent Application No. 2027556 completed Sep. 29, 2021.
Phuong, "On Preempting Advanced Persistent Threats Using Probabilistic Graphical Models", arxiv.org, Cornell University Library, 201 Olin Library Cornell University Ithaca, NY 14853, Mar. 2019, pp. 1-14.
Manuel et al., "A survey on automated dynamic malware-analysis techniques and tools", ACM Computing Surveys, vol. 44, No. 2, Feb. 2012, pp. 1-49.
Tokhtabayev et al., "Malware Analysis and Detection via Activity Trees in User-Dependent Environment", Aug. 2017, ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 211-222.
Search Report with regard to RU Patent Application No. 2020110068 dated Sep. 8, 2020.
International Search Report with regard to PCT/RU2020/000140 dated Nov. 19, 2020.
Search Report with regard to RU Patent Application No. 2020107922 dated Mar. 24, 2020.
International Search Report with regard to PCT/RU2020/000089 dated Oct. 29, 2020.
English Abstract for CN 107392019 retrieved on Espacenet on Dec. 2, 2021.

\* cited by examiner

METHOD AND SYSTEM FOR DETERMINING AFFILIATION OF SOFTWARE TO SOFTWARE FAMILIES

CROSS-REFERENCE

The present application claims priority to Russian Patent Application No. 2019139628, entitled "METHOD AND SYSTEM FOR DETERMINING AFFILIATION OF SOFTWARE TO SOFTWARE FAMILIES," and filed on Dec. 5, 2019, the entirety of which is incorporated herein by reference.

TECHNICAL FIELD

The present technology broadly relates to the field of computer technology; and, in particular, to methods and systems for determining affiliation of software to predetermined software families and/or authorships.

BACKGROUND

As it may be known, professional cybercriminals thoroughly elaborate an attack strategy and change it rarely, using the same malware for a long time with insignificant modifications.

At the same time, the developers of malicious SW (MSW) creating tools for cybercriminals could use the same software solution, for example, a function implementing cryptographic algorithm, for a long time in different samples of MSW created for different cybercriminal groups and associated with different MSW families.

Therefore, in the field of cyber security, it may be important to know with which MSW family a given sample of MSW is affiliated and/or who is an author (or a group thereof) of the given sample of MSW.

Signature analysis is a well-known method of MSW detection. This method is based on the search of a unique sequence of bytes in files including machine code of MSW, i.e. signature which is indicative of a specific MSW. A respective signature associated with the given sample of MSW may be determined based on analyzing a machine code associated therewith. Further, the respective signature can be stored into a virus signature database, to which an antivirus program may be provided access, thereby allowing for detection of the given sample of MSW.

However, this method is also well-known to cybercriminals. Therefore, nearly all types of modern MSW are constantly modified to change basic functionality thereof. As a result of such modifications, the files of a next version of the given MSW may acquire new properties, which may render the given MSW unrecognizable for antivirus signature analyzers as malicious, which may thus allow cybercriminals to conduct attacks without any obstacles.

Besides the modifications, various approaches of obfuscation are widely used. Broadly speaking, in the context of the present specification, "obfuscation" refers to a technique of modifying a machine code of the given MSW such that functionality thereof is preserved, however, analyzing it to determine operation algorithms becomes more complicated. The above-mentioned modifications to the given MSW could be performed either by a human or automatically, e.g. by so called polymorphic generator, which may be part of a malware.

At the same time, as a result of the obfuscation, operating functions of the given MSW are not significantly altered. For example, after the modification the given MSW will "look" differently only for signature analyzers, its code could be obfuscated and hence cannot be analyzed by a human; however, a set of operating functions of the given MSW performed before the obfuscation is likely to remain unchanged thereafter.

Certain prior art approaches are directed to determining authorship of different types of texts, such as literary, publicistic, or scientific based on stylometric analysis thereof.

An article written by Dauber et al., published by Drexel University, Philadelphia, USA, and entitled "*Stylometric Authorship Attribution in Collaborative Documents*", discloses applying stylometry to a novel dataset of multi-authored documents collected from Wikia using both relaxed classification with a support vector machine (SVM) and multi-label classification techniques. Five possible scenarios are defined that show that one, the case where labeled and unlabeled collaborative documents by the same authors are available, yields high accuracy on the dataset while the other, more restrictive cases yield lower accuracies. Based on the results of these experiments and knowledge of the multi-label classifiers used, there is proposed a hypothesis to explain this overall poor performance. Additionally, there is performed authorship attribution of pre-segmented text from the Wikia dataset showing that while this performs better than multi-label learning it requires large amounts of data to be successful.

A PhD thesis written by S. Afroz at Drexel University, Philadelphia, USA, and entitled "*Deception In Authorship Attribution*" discloses authorship attribution methods in adversarial settings where authors take measures to hide their identity by changing their writing style and by creating multiple identities; using a large feature set to distinguish regular documents from deceptive documents with high accuracy and present an analysis of linguistic features that can be modified to hide writing style; adapting regular authorship attribution to difficult datasets such as leaked underground forum; and presenting a method for detecting multiple identities of authors. Further, demonstrating the utility of the approach with a case study that includes applying the technique to an underground forum and manual analysis to validate the results, enabling the discovery of previously undetected multiple accounts.

An article written by Alexander Granin, published by the web resource habr.com, and entitled "*Text Analyzer*" appears to disclose an automatic approach to determining authorship of texts based on Hamming Neural Network.

SUMMARY

Developers of the present technology have realized that the stylometric approaches, i.e. those based on analyzing text stylistics, for determining program code authorship, may not be an optimal solution. Regardless of the programming language in which the code is written, defining the author style in it would be extremely difficult for the reason of the specific nature of the art. In cases where the program source code is not available, the stylometric approaches for samples of MSW analysis does not appear to be appropriate.

Therefore, non-limiting embodiments of the present technology are directed to methods and systems for determining affiliation of given software to a predetermined family of software and/or authorship based on specific features associated therewith that are derived from a machine code thereof. It should be expressly understood that the method and systems described herein are not limited to MSW and may be used for any software.

More specifically, according to a first broad aspect of the present technology, there is provided a method for determining an affiliation of a given software to target software. The method is executable by a processor. The method comprises: receiving, by the processor, a file including a machine code associated with the given software; determining a file format of the file associated with the given software, the determining comprising applying a signature analysis to the file; identifying, by the processor, based on the file format, in the machine code of the given software, at least one function of a plurality of functions associated with the given software; parsing, by the processor, the at least one function to identify therein at least one function command; generating, by the processor, for each one of the plurality of functions associated with the given software, a respective function identifier, a given function identifier associated with the at least one function being generated based on each of the at least one function command; aggregating, by the processor, respective function identifiers of the plurality of functions associated with the given software, thereby generating an aggregated array of function identifiers associated with the given software; applying, by the processor, at least one classifier to the aggregated array of function identifiers to determine a likelihood parameter indicative of the given software being affiliated to a respective target software, the at least one classifier having been trained for determining an affiliation to the respective target software; in response to the likelihood parameter being equal to or greater than a pre-determined likelihood parameter threshold: identifying the given software as being affiliated to the respective target software; storing data indicative of the given software in a database of affiliated software; and using the data indicative of the given software for further determining affiliation to the respective target software.

In some implementations of the method, if the machine code has been processed using one of predetermined processes, the identifying the at least one function further comprises: executing, by the processor, the machine code associated with the given software in an isolated program environment to receive one or more memory dumps associated with the given software; restoring, based on the one or more memory dumps, the machine code for identifying therein the at least one function.

In some implementations of the method, one of the predetermined processes comprises one of encryption, compression, and obfuscation.

In some implementations of the method, the identifying the at least one function further comprises disassembling, by the processor, the machine code of the given software.

In some implementations of the method, the identifying the at least one function further comprises identifying, in the machine code, library functions and deleting the library functions therefrom.

In some implementations of the method, the identifying the at least one function further comprises identifying, in the machine code, machine code portions inherently non-indicative of the affiliation to the target software and deleting the machine code portions inherently non-indicative of the affiliation to the target software machine code portions from the machine code.

In some implementations of the method, the at least one function command comprises at least one action and at least one argument associated with the at least one action; and the generating the respective function identifier further comprises: applying a hash function to the at least one action and to each value of the at least one argument to generate respective hash function values, each one of the respective hash function values being a respective number sequence; concatenating the respective hash function values.

In some implementations of the method, wherein the at least one classifier has been trained to determine the affiliation to the respective target software based on a training set of data, and the method further comprising generating the training set of data, the generating comprising: receiving, by the processor, a plurality of target software files, each target software file including a respective target machine code associated with the respective target software; determining, by the processor, for each one of the plurality of target software files, a respective target file format, the determining comprising applying, by the processor, a signature analysis to each of the plurality of target software files; identifying, by the processor, based on the respective target file format associated with a given one of the plurality of target software files, in a respective target machine code, at least one target function; parsing, by the processor, the at least one target function to identify therein at least one target function command; generating, by the processor, based on each of the at least one target function command, a respective target function identifier associated with the at least one target function, the respective target function identifier comprising an associated number sequence; aggregating, by the processor, associated number sequences associated with respective target functions over the plurality of target software files, thereby generating a number array associated with the respective target software; identifying, by the processor, in the number array associated with the respective target software, at least one pattern, wherein: the at least one pattern comprises a predetermined repetitive number sequence within the number array, and the predetermined repetitive number sequence is indicative of a frequency of occurrence of at least one associated target function command within the respective target software; storing the at least one pattern with a label indicative of an association between the at least one pattern and the respective target software for inclusion thereof into the training set of data.

In some implementations of the method, if the respective target machine code has been processed using one of predetermined processes, the identifying the at least one target function further comprises: executing, by the processor, the respective target machine code associated with the respective target software in an isolated program environment to receive one or more memory dumps associated with the respective target software; restoring, based on the one or more memory dumps, the respective target machine code for identifying therein the at least one target function.

In some implementations of the method, a length of the predetermined repetitive number sequence is determined as a constant number.

In some implementations of the method, the length of the predetermined repetitive number sequence is further determined iteratively, based on a current number thereof within the number array.

In some implementations of the method, the method further comprises determining a frequency of occurrence value associated with the at least one pattern, the determining being according to the following formula:

$$\lambda = \frac{L}{K},$$

where L is a frequency of occurrence of the at least one pattern within the number array associated with the respective target software, and K is a number of machine codes in the plurality of machine codes associated with the respective target software used for generating the training set of data.

In some implementations of the method, the method further comprises assigning a weight value to the at least one pattern.

In some implementations of the method, the weight value is increased if the at least one pattern is indicative of mathematical operations used within the respective target software.

In some implementations of the method, the weight value is increased if the at least one pattern is indicative of at least two four-byte constants used within the respective target software.

In some implementations of the method, the weight value is determined based on the frequency of occurrence value associated with the at least one pattern.

In accordance with a second broad aspect of the present technology, there is provided a system for determining an affiliation of a given software with target software. The system comprises a computing device. The computing device further comprises: a processor; a non-transitory computer-readable medium comprising instructions. The processor, upon executing the instructions, is configured to: receive a file including a machine code associated with the given software; determine a file format of the file associated with the given software, the determining comprising applying a signature analysis to the file; identify, based on the file format, in the machine code of the given software, at least one function of a plurality of functions associated with the given software; parse, the at least one function to identify therein at least one function command; generate, for each one of the plurality of functions associated with the given software, a respective function identifier, a given function identifier associated with the at least one function being generated based on each of the at least one function command; aggregate respective function identifiers of the plurality of functions associated with the given software, thereby generating an aggregated array of function identifiers associated with the given software; apply at least one classifier to the aggregated array of function identifiers to determine a likelihood parameter indicative of the given software being affiliated to a respective target software, in response to the likelihood parameter being equal to or greater than a predetermined likelihood parameter threshold: identify the given software as being affiliated to the respective target software; store data indicative of the given software in a database of affiliated software; and use the data indicative of the given software for further determining affiliation to the respective target software.

In some implementations of the system, if the machine code has been processed using one of predetermined processes, the processor is further configured to: execute, by the processor, the machine code associated with the given software in an isolated program environment to receive one or more memory dumps associated with the given software; restore, based on the one or more memory dumps, the machine code for identifying therein the at least one function.

In some implementations of the system, one of the predetermined processes comprises one of encryption, compression, and obfuscation.

In some implementations of the system, to identify the at least one function, the processor is further configured to disassemble the machine code of the given software.

In some implementations of the system, to identify the at least one function, the processor is further configured to identify, in the machine code, library functions and delete the library functions therefrom.

In some implementations of the system, to identify the at least one function, the processor is further configured to identify, in the machine code, machine code portions inherently non-indicative of the affiliation to the target software and deleting the machine code portions inherently non-indicative of the affiliation to the target software from the machine code.

Platform or computer platform is an environment where a given piece of software is executed. The platform includes both hardware (e.g. random-access memory, hard disk) and software (BIOS, operating system, etc.). Non-limiting example of a platform may be a Win32 API platform.

Obfuscation or code obfuscation is deliberate modifying an initial machine code of a software program such that it is difficult for humans to understand, while preserving its functionality.

Logging is automatic recording actions performed by a software program in chronological order into a specific file, which may be referred to as a log or a report.

Machine code associated with a given software denotes a set of instructions associated with the given software and developed in any programming language; however, further translated into a respective series of numerical symbols to be read and executed directly in a central processing unit (CPU)—that is, a machine language or hardware-dependent programming language. The machine code can also be referred to as a lowest-level programming language set of instructions associated with the given software, which generally cannot be read and/or interpreted by a human and is only intended for execution in the CPU.

Machine code portions inherently non-indicative of affiliation with target software are code snippets, which could be found in a variety of programs associated with a specific type of software—the target software. Such machine code portions are used not only in software of specified purpose or by a certain author but practically ubiquitously. For example, such machine code portions may be indicative of, without being limited to, function prologues in a respective machine code or in a respective assembly code, as an example.

Framework is a program platform defining a structure of a program system—for example, a Django framework.

Further, in the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented to explain the essence of the technology and are not limiting the scope thereof in any way, where.

DETAILED DESCRIPTION OF THE TECHNOLOGY

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to computer-implemented methods and systems for determining affiliation of given software to target software based on analyzing an associated machine code. In some non-limiting embodiments of the present technology the target software may include software of a predetermined software family and/or of a predetermined authorship.

According to certain non-limiting embodiments of the present technology, each one of the methods described herein below can be executed by a hardware processor—for example, a processor 401 of a computing device 400, which will be described below with reference to FIG. 4.

Determining Affiliation to Target Software

Figure 1:
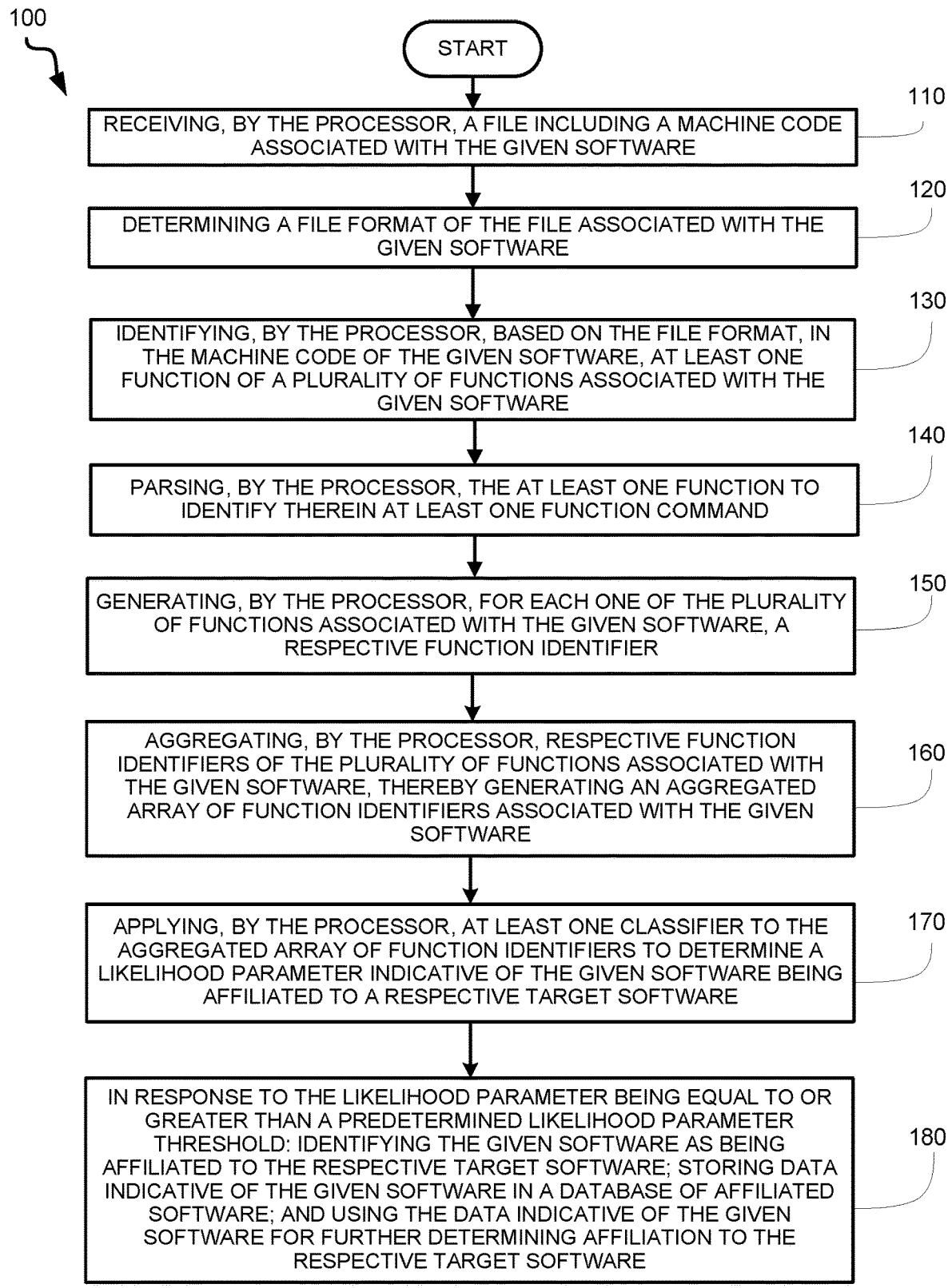
FIG. 1 depicts a flowchart diagram of a method for determining an affiliation of a given software to a target software based on specific features thereof derived from a machine code associated therewith, in accordance with certain non-limiting embodiments of the present technology.

With reference to FIG. 1, there is depicted a flowchart diagram of a first method 100 for determining the affiliation of the given software with the target software, in accordance with certain non-limiting embodiments of the present technology.

Step 110: Receiving, by the Processor, a File Including a Machine Code Associated with the Given Software The first method 100 commences at step 100 where the processor 401 can be configured to receive a file containing a machine code associated with the given software for further analysis. In some non-limiting embodiments of the present technology, the file containing the machine code can be of various formats, including, without limitation, an executable program file, such as an *.exe file; a dynamic library file, such as a *.dll file; and the like.

The first method 100 further proceeds to step 120.

Step 120: Determining a File Format of the File Associated with the Given Software At step 120. according to certain non-limiting embodiments of the present technology, the processor 401 can be configured to determine a file format of the file containing the machine code received at step 110. It should be expressly understood that how the file format can determined by the processor 401 is not limited. For example, in some non-limiting embodiments of the present technology, the processor 401 can be configured to use a script specifically preconfigured for comparing a signature of the file containing the machine code to a set of predetermined signatures respectively associated with (and/or indicative of) various file formats. To that end, in response to determining a match the signature of the file and at least one of the set of predetermined signatures, the processor 401 can be configured to identify the file format as being one associated with the at least one of the set of predetermined signatures (which, in general, could differ from the format associated with this file extension in a used operating system).

Further, in some non-limiting embodiments of the present technology, the processor 401 can be configured to determine if the machine code has been processed. For example, the processor 401 can be configured to determine if the machine code associated with the given software has been processed by one of the following predetermined processes: encryption, compression, and obfuscation. How the processor 401 is configured to determine if the machine code has been processed is not limited. In specific non-limiting embodiments of the present technology, to that end, the processor 401 can be configured to calculate a partial entropy of the machine code. Further, in response to the partial entropy, within a given portion of the machine code, exceeding a predetermined entropy threshold value (e.g., 6), the processor 401 can be configured to identify the machine code as being processed.

Further, in some non-limiting embodiments of the present technology, in response to determining that machine code has been processed, the processor 401 can be configured to execute the file containing it in an isolated program environment.

Accordingly, executing the file in the isolated program environment, the processor 401 can be configured to receive one or more memory dumps generated in response to the executing the file. Broadly speaking, a given memory dump is a "footprint" of the file associated with the given software, executed by the processor 401, on a runtime memory. Thus, the given memory dump can include machine code of a plurality of function commands associated with the given software. In some non-limiting embodiments of the present technology, such memory dumps could be generated with a relatively high frequency, for example, one per each clock cycle of the processor 401 of the computing device 400, which may further enable to receive more detailed data on the executed file and the machine code contained therein.

In some non-limiting embodiments of the present technology, to receive the one or more memory dumps, the processor 401 can be configured to use a specifically pre-configured application therefor. For example, and not as a limitation, the processor 401 can be configured to apply a ProcDump™ utility.

As each memory dump is representative of a respective portion of the machine code located in the runtime memory at a moment of its generation, the processor 401 can thus be configured to restore the machine code based on the one or more memory dumps generated in response to the executing the file in the isolated program environment. Therefore, using the runtime memory as a data source, the processor 401 can be configured to receive a "clean" version of the machine code before having been processed by one of the encryption, the compression, the obfuscation, and the like. Further analysis of the machine code may include disassembling and/or parsing, operation algorithm of which is based on the specification of a used computing architecture (such as x86 architecture), as will be described below.

The first method 100 thus advances to step 130.

Step 130: Identifying, by the Processor, Based on the File Format, in the Machine Code of the Given Software, at Least One Function of a Plurality of Functions Associated with the Given Software At step 130, according to certain non-limiting embodiments of the present technology, the processor 401 can be configured to identify, in the machine code associated with the given software, a plurality of functions associated therewith. In the context of the present specification, the term "function" denotes a portion of the machine code, which could be accessed within the machine code by reference thereto. In most cases, an identifier can be linked to a given function; however, many languages allow for anonymous functions. The address of the first (operator) instruction, being part of the given function, to which the control is passed when referring to the function, is inseparably associated with a name of the given function. Having executed the given function, the control is returned back to a return address, i.e., to that portion of the machine code, from where the given function was called.

In some non-limiting embodiments of the present technology, to identify the plurality of functions associated with the given software, the processor 401 can be configured to disassemble the machine code, thereby restoring an assembly code associated with the given software. It should be expressly understood that how the disassembling is executed is not limited; and in some non-limiting embodiments of the present technology, the processor 401 can be configured to utilize a disassembler configured to translate the machine code into the assembly language or IL language set of instructions. In specific non-limiting embodiments of the present technology, the disassembler may include, without limitation, at least one of: an IDA™ Pro disassembler, a Sourcer™ disassembler, and the like. As a result of applying the disassembler, the machine code becomes marked: boundaries of each one of the plurality of functions associated with the given software can thus be explicitly marked in it. Further, in some non-limiting embodiments of the present technology, portions of the assembly code within respective boundaries are saved in a dedicated text format file. The remainder of the assembly code (beyond the boundaries) can be discarded from further processing as considered to include in significant information on the affiliation of the given software to the target software.

Thus, in some non-limiting embodiments of the present technology, the plurality of functions associated with the given software can be represented in one of the machine code and the assembly code.

Further, in some non-limiting embodiments of the present technology, the processor 401 can be configured to analyze the plurality of functions associated with the given software to detect therein and delete therefrom certain standard functions not indicative of the affiliation of the given software to the target software. For example, the processor 401 can be configured to identify, within the plurality of functions, library functions. The library functions are widely used by a variety of software and programs, therefore, their presence in the machine code and/or the assembly code associated with the given software is not specific to certain software families and/or authorship. According to certain non-limiting embodiments of the present technology, excluding the library functions may enable to simplify analysis significantly and, at the same time, obtain better training results due to the fact that the decision rules are trained based on commands uniquely associated with the given software under analysis.

According to certain non-limiting embodiments of the present technology, the signature analysis and the deleting, the library functions can be performed by the processor 401 executing an auxiliary script. An algorithm of the auxiliary script could represent, for example, a sequential comparison of each function within the plurality of functions associated with the given software with a prearranged set of signatures (regular expressions). Each of these signatures corresponds to a specific library function preliminarily described as a signature; when a function corresponding to any signature is detected, a whole portion of the machine code and/or the assembly code composing a function body and header of the function are deleted. Upon completion of processing the plurality of functions by the auxiliary script, in some non-limiting embodiments of the present technology, the processor 401 may be configured to update the plurality of functions associated with the given software and save the so updated plurality of functions for further processing, as will be described below.

In some non-limiting embodiments of the present technology, the processor 401 may further be configured to identify, within the plurality of functions, and delete therefrom portions of the machine code and/or the assembly code inherently non-indicative of the affiliation to the target software. In the context of the present specification, machine code portions can be inherently non-indicative of the affiliation to the target software, by virtue of the portions of the machine code associated with the given software not being specific enough for further analysis of the given software for the affiliation thereof to the target software (for example, due to the fact that they often occur in different software and, thus, are not indicative enough of affiliation to any given software); and thus these machine code portions can be omitted from the machine code without affecting the accuracy of such analysis. For example, inherently non-indicative machine code portions may include those indicative of function prologues of functions within the assembly code.

Figure 2:
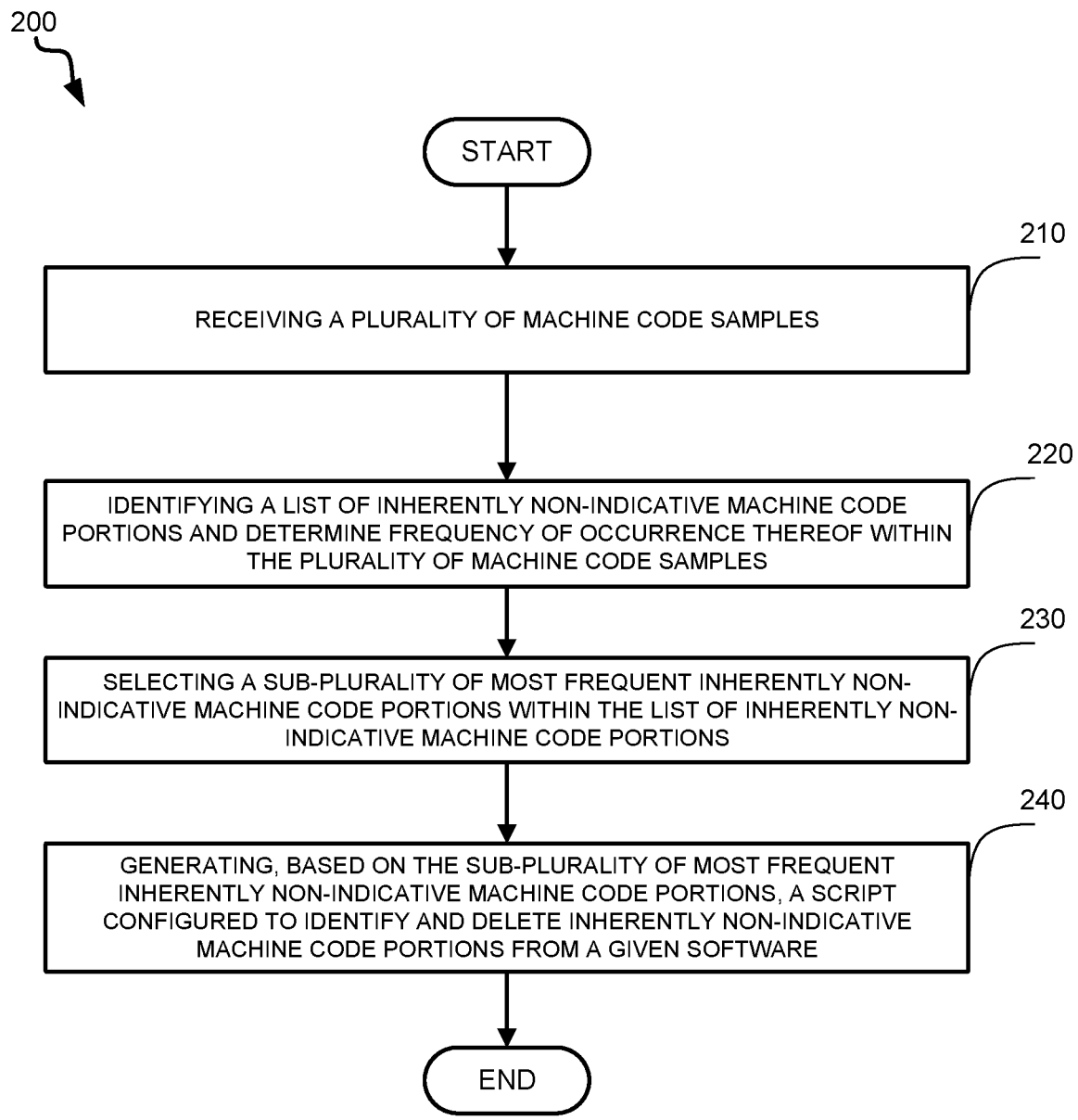
FIG. 2 depicts a flowchart diagram of a method for identifying and deleting machine code portions inherently non-indicative of the affiliation to the target software in the machine code associated with given software, in accordance with certain non-limiting embodiments of the present technology.

To that end, the processor 401, according to certain non-limiting embodiments of the present technology, after executing step 130 of the first method 100, can be configured to execute a second method 200, a flowchart diagram of which is depicted in FIG. 2, and to which reference is currently being made.

Step 210: Receiving a Plurality of Machine Code Samples

The second method 200 commences at step 210 with the processor 401 being configured to receive a plurality of machine code samples associated with various software. In certain non-limiting embodiments of the present technology, the plurality of machine code samples may include, for example hundreds, thousands, or even hundreds of thousands of machine code samples different in functionality and having been developed by different teams of developers.

The second method 200 further proceeds to step 220.

Step 220: Identifying a List of Inherently Non-Indicative Machine Code Portions and Determine Frequency of Occurrence Thereof within the Plurality of Machine Code Samples At step 220, according to certain non-limiting embodiments of the present technology, the processor 401 can be configured to identify, within the machine code, inherently non-indicative machine code portions repeatedly occurred therewithin. In some non-limiting embodiments of the present technology, the processor 401 can further be configured to determine a frequency of occurrence of each inherently non-indicative machine code portion within the plurality of machine code samples. For example, in some non-limiting embodiments of the present technology, the processor 401 can be preliminarily provided with a minimum sequence length value, e.g., 20 symbols, for identifying the inherently non-indicative machine code portions within the plurality of machine code samples. In some non-limiting embodiments of the present technology, a maximum sequence length value may not be preset. In alternative non-limiting embodiments of the present technology, the maximum sequence length can be predetermined to be from 15 to 250 symbols, as an example. Thus, the processor 401 can be configured to generate a list of inherently non-indicative machine code portions with associated respective frequencies of occurrences thereof.

The second method 200 thus proceeds to step 230.

Step 230: Selecting a Sub-Plurality of Most Frequent Inherently Non-Indicative Machine Code Portions within the List of Inherently Non-Indicative Machine Code Portions Further, at step 230, the processor 401 can be configured to select, from the list of inherently non-indicative machine code portions generated at the previous steps, based on the associated respective frequencies of occurrences, a sub-plurality of most frequent inherently non-indicative machine code portions. For example, a given inherently non-indicative machine code portion has been occurred once in each one of the plurality of machine code samples including, for example, 100 machine code samples, which amounts to 100 occurrences of the given inherently non-indicative machine code portion therewithin.

In some non-limiting embodiments of the present technology, the processor 401 can be configured to select the sub-plurality of most frequent inherently non-indicative machine code portions based on a predetermined frequency threshold value, which can be determined, for example, based on a number of machine code samples within the plurality of machine code samples including the given inherently non-indicative machine code portion.

The second method 200 thus advances to step 240.

Step 240: Generating, Based on the Sub-Plurality of Most Frequent Inherently Non-Indicative Machine Code Portions, a Script Configured to Identify and Delete Inherently Non-Indicative Machine Code Portions from a Given Software At step 240, according to certain non-limiting embodiments of the present technology, the processor 401 may be configured to identify, in the machine code associated with the given software, based on the sub-plurality of most frequent inherently non-indicative machine code portions, inherently non-indicative machine code portions and delete them therefrom.

In some non-limiting embodiments of the present technology, as an example, the processor 401 can be configured, based on the sub-plurality of inherently non-indicative machine code portions selected at step 230, to generate a specific program script, which can further be used for identifying and deleting inherently non-indicative machine code portions from various software.

Thus, by executing the second method 200, the processor 401 can be configured to delete the inherently non-indicative machine code portions from the machine code associated with the given software at step 130 of the first method 100. Accordingly, in some non-limiting embodiments of the present technology, upon completion of the second method 200, the processor 401 can be configured to proceed with executing the first method 100.

According to certain non-limiting embodiments of the present technology, such code portions can be identified and deleted from the assembly code associated with the given software, as well, without departing from the scope of the present technology, to which the above definition and the second method 200 can apply mutatis mutandis.

The second method 200 thus terminates.

Thus, at step 130, the plurality of functions associated with the given software does not include the library functions and inherently non-indicative machine code portions The first method 100 hence advances to step 140.

Step 140: Parsing, by the Processor, the at Least One Function to Identify Therein at Least One Function Command Referring back to FIG. 1, at step 140, according to certain non-limiting embodiments of the present technology, the processor 401 can be configured to identify within a given one of the plurality of functions associated with the given software at least one function command. According to certain non-limiting embodiments of the present technology, the at least one function command can comprise a given pair "action-argument" further including an action and at least one argument associated with the at least one action.

As alluded to above, each of the functions represented in the machine code can be disassembled using the disassembler. For example, at disassembling the following portion of the machine code associated with the given one of the plurality of functions:

. . . D6 00 C7 05 3C 3F 42 00 00 00 01 00 FF FF 00 . . .

the IDA™ Pro disassembler can be configured to identify the at least one function command (that is, "mov"):

mov dword_423F3C, 10000h which has the following view in the machine code:

C7 05 3C 3F 42 00 00 00 01 00.

Further, according to certain non-limiting embodiments of the present technology, within the at least one function command, the processor 401 can be configured to identify the at least one argument associated with the at least one function command, which is, in the example above, indicated as following the decimal point according to the assembler syntax:

mov dword 423F3C, 10000h

In alternative non-limiting embodiments of the present technology, the processor 401 can be configured to skip the procedure of the identifying the at least one argument associated with the at least one functions command.

In accordance with certain non-limiting embodiments of the present technology, the at least one function command ("mov", in the example above) is not used for further analysis as the function commands, per se, may not be indicative of the machine code they are derived from—for example, around 15-17 substantially different associated machine code portions may correspond to the "mov" function command.

Therefore, in some non-limiting embodiments of the present technology, the processor 401 can be configured to: (1) select portions from the machine code corresponding to function commands; (2) save them, for example, each on a separate line; and (3) analyze the so generated list of the function commands to detect associated actions (since respective arguments have already been identified). To that end, in some non-limiting embodiments of the present technology, the processor 401 can be configured to apply a script specifically configured for this purpose. An algorithm of this script can be configured to review the portions of the machine code respectively associated with the function commands based on the specification of the used architecture; in the present example, it is the x86 architecture.

Thus, in the example above, the script may be configured to execute the following verifications:
whether a first byte of a machine code portion associated with the at least one function command is one of the prefixes specified for the x86 architecture, and
whether the first byte is an indicator of a two-byte operation.

In the example above, both verifications returned negative results, and the script thus proceeds with reviewing the machine code portion associated with the at least one function command. The script, in accordance with x86 architecture specification, can be configured to interpret the first byte in this machine code portion, C7h, as an operation code, the complete view of which should be specified depending on the contents of the next, i.e. a second byte 05h. The script, in accordance with the specification of x86 architecture, thus extracts the field contents (reg) of the second byte:
05h=(mod)00 (reg)000 (r/m)101
and adds it to the operation code. Thus, the operation code acquires the following view:
C7h 000b,
which is further saved, for example, in association with the at least one argument 10000h identified and stored before.

Further, in accordance with the x86 architecture specification, for this operation code the field contents (mod) and (r/m) of the next byte indicate that the following four bytes of the machine code portion under analysis are 3C 3F 42 00, and, in the present example, are used to define a command address as a DS register offset. In some non-limiting embodiments of the present technology, the processor 401 can be configured to ignore the command address, and therefore, in the present example, the four bytes of the machine code portion indicative of the command address can thus be discarded from further analysis.

Finally, in accordance with certain non-limiting embodiments of the present technology, the last four bytes of the machine code portion of the present example, that is, 00 00 01 00, are representative of the at least one argument 10000h, which has been already extracted from the disassembling results. Therefore, further analysis of this machine code portion is not performed.

In alternative non-limiting embodiments of the present technology, where the processor 401 is configured to skip the procedure of identifying the at least one argument, the last four bytes of the machine code portion (00 00 01 00) can further be used for the identifying the at least one argument.

For example, given the fact that, in the x86 architecture, the little-endian notation is used for recording the machine code, the at least one argument can be identified by the following conversion:
00 00 01 00→10000h.

Thus, in the example above, from the machine code portion of the at least one function command under analysis C7 05 3C 3F 42 00 00 00 01 00, the given "action-argument" pair can thus be obtained and stored in a dedicated file:
C7h 000b 10000h.

The first method 100 thus proceeds to step 150.

Step 150: Generating, by the Processor, for Each One of the Plurality of Functions Associated with the Given Software, a Respective Function Identifier According to certain non-limiting embodiments of the present technology, at step 150, the processor 401 can be configured, based on the given pair "action-argument", to generate a respective function identifier. In the context of the present specification, the term "function identifier" denotes a number sequence generated by the processor 401 for a given pair "action-argument" and associated with a respective one of the plurality of functions of the given software. In various non-limiting embodiments of the present technology, the number sequence associated with the given pair "action-argument" can be represented as a decimal number, a hexadecimal number, a binary number, and the like.

In some non-limiting embodiments of the present technology, the generating the respective function identifier can include applying, by the processor 401, one or more hash functions to the given pair "action-argument". In the other non-limiting embodiments of the present technology, the processor 401 can be configured to convert the number sequence associated with the given pair "action-argument" into a decimal record format and concatenate the so generated decimal numbers, thereby generating a single decimal number being the respective function identifier:
C7h 000b 10000h→199 0 65536→199065536

Thus, in some non-limiting embodiments of the present technology, the processor 401 can be configured to generate, for pairs "action-argument" associated with respective ones of the plurality of functions of the given software, a plurality of function identifiers being respective number sequences s described above.

The first method 100 hence advances to step 160.

Step 160: Aggregating, by the Processor, Respective Function Identifiers of the Plurality of Functions Associated with the Given Software, Thereby Generating an Aggregated Array of Function Identifiers Associated with the Given Software At step 160, in some non-limiting embodiments of the present technology, the processor 401 can be configured to aggregate the plurality of function identifiers into an aggregated array of function identifiers. To that end, each one of the plurality of function identifiers may be represented as $P_{ij}$, where i indicates a sequential number of the respective one of the plurality of functions, in which the given "action-argument" pair has been identified, and j indicates a sequential number of the given "action-argument" pair within the respective function, in which the given pair has been detected.

As it may become apparent, machine codes of the majority of modern software programs can include a considerable number of functions. Therefore, in certain non-limiting embodiments of the present technology, the machine code of the given software can be transformed into an aggregated array of function identifiers including n lines, wherein n is indicative of a total number of non-library functions having been identified during the above analysis:

$$F1 = P11, P12, P13, \ldots P1j \ldots, P1a \ldots$$

$$Fi = Pi1, Pi2, Pi3, \ldots Pij \ldots, Pib \ldots$$

$$Fn = Pn1, Pn2, Pn3, \ldots Pnj, \ldots, Pnc. \quad (1)$$

As it can be appreciated from the above, indices a, b, and c in Equation (1) are indicative of different pairs "action-argument" within respective functions, in a general case.

The first method 100 thus proceeds to step 170.

Step 170: Applying, by the Processor, at Least One Classifier to the Aggregated Array of Function Identifiers to Determine a Likelihood Parameter Indicative of the Given Software being Affiliated to a Respective Target Software At step 170, according to certain non-limiting embodiments of the present technology, the processor 401 can be configured to analyze the aggregated array of function identifiers expressed by Equation (1) to determine the affiliation of the given software to the target software. To that end, the processor 401 can be configured to feed the aggregated array of function identifiers to one or more classifiers having been trained to determine the affiliation with the target software. How the one or more classifiers can be trained, in accordance with certain non-limiting embodiments of the present technology, will be described below with reference to FIG. 3.

Further, in accordance with certain non-limiting embodiments of the present technology, the one or more classifiers, when applied to the aggregated array of function identifiers, may be configured to generate a likelihood parameter, which may be expressed, for example, as a numerical estimate of probability, that the given software is affiliated to the target software. The likelihood parameter can be constantly updated, i.e. reviewed at input of each portion of the machine code represented by Equation (1).

The first method 100 hence proceeds to step 180.

Step 180: In Response to the Likelihood Parameter being Equal to or Greater than a Predetermined Likelihood Parameter Threshold: Identifying the Given Software as being Affiliated to the Respective Target Software; Storing Data Indicative of the Given Software in a Database of Affiliated Software; and Using the Data Indicative of the Given Software for Further Determining Affiliation to the Respective Target Software At step 180, in response to the likelihood parameter generated by the one or more classifiers being equal to or greater than a predetermined likelihood parameter threshold value, the processor 401 can be configured to identify the given software as being affiliated to the target software. As noted hereinabove, in some non-limiting embodiments of the present technology, the target software may include software of a predetermined software family and/or of a predetermined authorship.

Further, in certain non-limiting embodiments of the present technology, the processor 401 may be configured to store data indicative of the given software in a dedicated database for further use. For example, the processor 401 can be configured to use the data indicative of the given software to train the one or more classifiers to determine affiliation of other software to the given software.

In other non-limiting embodiments of the present technology, where the likelihood parameter is below the predetermined likelihood parameter threshold value, the processor 401 can be configured to determine that the given software is not affiliated to the target software; and thus, the processor 401 would not proceed to store the data indicative of the given software for further use.

The first method 100 thus terminates.

Training Classifier

Figure 3:
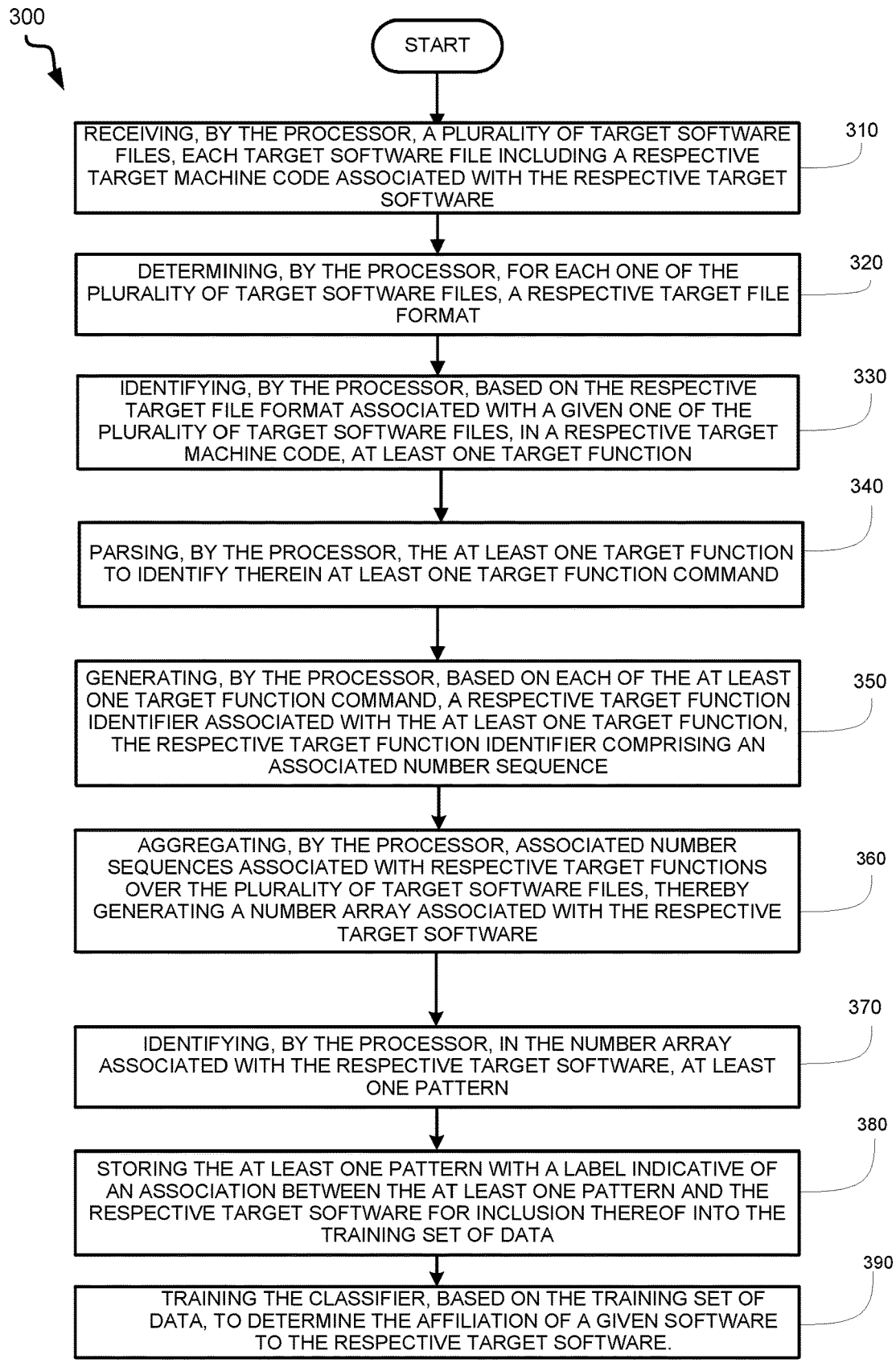
FIG. 3 depicts a flowchart diagram of a method for training a classifier used in the method of FIG. 1 for determining the affiliation of the given software with the target software, in accordance with certain non-limiting embodiments of the present technology.

As alluded to above, according to certain non-limiting embodiments of the present technology, the processor 401 can be configured to train the one or more classifier to determine the affiliation with respective target software, which may further be used in the first method 100. With reference now to FIG. 3, there is depicted a flowchart diagram of a third method 300 for training a classifier to determine the affiliation with a given target software, in accordance with certain non-limiting embodiments of the present technology.

Step 310: Receiving, by the Processor, a Plurality of Target Software Files, Each Target Software File Including a Respective Target Machine Code Associated with the Respective Target Software The third method 300 commences at step 310 with the processor 401 being configured to receive a plurality of target software files including associated target machine codes associated with the given target software. According to certain non-limiting embodiments of the present technology, a total number of target machine codes in the plurality of the received target software files can be predetermined and comprise, for example, without limitation around 30-70 target machine codes of a predetermined software family to which the given target software belongs. Alternatively, the processor 401 can be configured to receive around 20-30 target machine codes of a predetermined authorship associated with the given target software. Further, the processor 401 can be configured to analyze each one of the plurality of target software files, for example, sequentially.

The third method 300 hence advances to step 320.

Step 320: Determining, by the Processor, for Each One of the Plurality of Target Software Files, a Respective Target File Format At step 320, according to certain non-limiting embodiments of the present technology, the processor 401 can be configured to determine a respective file format of each one of the plurality of target software files. In these embodiments, the processor 401 can be configured to execute step 320 similar to executing step 120 of the first method 100 described above.

Further, as described above in respect of step 120 of the first method 100, in some non-limiting embodiments of the present technology, the processor 401 can be configured to determine if a given one of the plurality of target software files associated with the given target software has been processed by one of the following predetermined processes: encryption, compression, and obfuscation. In response to determining that the given one of the plurality of target software files has been processed, the processor 401 can be configured to execute the given one of the plurality of target software files in the isolated environment to restore an associated target machine code using one or more memory dumps generated therein in a runtime memory available to the processor 401.

The third method 300 thus proceeds to step 330.

Step 330: Identifying, by the Processor, Based on the Respective Target File Format Associated with a Given One of the Plurality of Target Software Files, in a Respective Target Machine Code, at Least One Target Function At step 330, the processor 401 can be configured to identify, in given one of a plurality of target machine codes respectively associated with the plurality of target software files of the given target software, a respective plurality of target functions. This step can be executed substantially similar to step 130 of the first method 100 described above.

Further, as described above, the processor 401 can be configured to identify and delete from the respective plurality of target functions associated library functions and machine code portions inherently non-indicative of the affiliation of the given one of the plurality of target software files to the given target software. In some non-limiting embodiments of the present technology, the processor 401 can be configured to identify and delete the latter from the given one of the plurality of target software files by executing the second method 200 described above with reference to FIG. 2.

Thus, the so refined respective plurality of target functions can further be processed.

The third method 300 thus proceeds to step 340.

Step 340: Parsing, by the Processor, the at Least One Target Function to Identify Therein at Least One Target Function Command Akin to executing step 140 of the first method 100 described above, at step 340, the processor 401 can be configured to parse the at least one target function to identify therein at least one target function command. Accordingly, as described above, the at least one function command may further comprise at least one target pair "action-argument" including a given target action and a target argument associated therewith.

The third method 300 thus proceeds to step 350.

Step 350: Generating, by the Processor, Based on Each of the at Least One Target Function Command, a Respective Target Function Identifier Associated with the at Least One Target Function, the Respective Target Function Identifier Comprising an Associated Number Sequence At step 350, according to certain non-limiting embodiments of the present technology, the processor 401 can be configured to generate for the at least one target pair "action-argument" a respective target function identifier. In some non-limiting embodiments of the present technology, the processor 401 can be configured to generate the respective target function identifier as a respective number sequence, similar to generating the respective function identifier as described above in respect of step 150 of the first method 100.

Further, the processor 401 can be configured to save the respective target function identifier associated with the at least one target pair "action-argument" for further use.

The third method 300 further advances to step 360.

Step 360: Aggregating, by the Processor, Number Sequences Associated with Respective Target Functions Over the Plurality of Target Software Files, Thereby Generating a Number Array Associated with the Respective Target Software At step 360, according to certain non-limiting embodiments of the present technology, the processor 401 can be configured to aggregate target function identifiers over the plurality of target software files to generate a target number array associated with the given target software. For example, the processor 401 can be configured to aggregate the target function identifiers in an order of occurrence of functions associated therewith as described above with respect to step 160 of the first method 100.

Thus, the target number array is associated with one of the plurality of target software files associated with the predetermined software family and the predetermined authorship.

The method thus proceeds to step 370.

Step 370: Identifying, by the Processor, in the Number Array Associated with the Respective Target Software, at Least One Pattern At step 370, according to certain non-limiting embodiments of the present technology, the processor 401 can be configured to identify, in the target number array, at least one pattern associated with the given target software. In some non-limiting embodiments of the present technology, the at least one pattern comprises a predetermined repetitive number sequence within the target number array. Thus, in these embodiments, the predetermined repetitive number sequence can be said to be indicative of a frequency of occurrence of the at least one target pair "action-argument" within the given target software.

According to certain non-limiting embodiments of the present technology, a length of the predetermined repetitive number sequence, i.e. a number of symbols therein, can be predetermined. Thus, in some non-limiting embodiments of the present technology, the length of the predetermined repetitive number sequence could be based on an interval, for example, from 4 to 10 symbols within the target number array or, alternatively, for example, from 60 to 80 symbols within the target number array. In other non-limiting embodiments of the present technology, the length of the predetermined repetitive number sequence could be predetermined as a constant number, e.g. 40 symbols within the target number array associated with the given target software.

In yet other non-limiting embodiments of the present technology, the length of the predetermined repetitive number sequence could be determined iteratively, based on a current number of such a predetermined repetitive number sequence within the aggregated array of target identifiers. In these embodiments, a search begins, for example, at an initial length of 8 symbols. Once a number of identified number sequences of the initial length exceeds a predetermined pattern threshold value (100, as an example), the processor 401 can be configured to increase the initial length by one, and the search starts over omitting shorter number sequences detected before. Such cycle is repeated until the number of patterns of a maximum possible length less than the predetermined pattern threshold value is identified. Thus, the at least one pattern may further be part of a training set of data for training the classifier.

In some non-limiting embodiments of the present technology, the processor 401 can be configured to assign to the at least one pattern a respective weight value.

In some non-limiting embodiments of the present technology, the respective weight value can be determined based on types of commands and operations associated with the at least one pattern. For example, the respective weight value can be 2 times exceeding respective weight values of other patterns if the at least one pattern is indicative of commands associated with at least one math operation; or, in other implementations, if around 80% and more of the commands associated with the at least one pattern include math operations. In another example, the respective weight value can be, e.g. 3 times exceeding weight values of other patterns, if the at least one pattern is indicative of at least two four-byte constants.

By contrast, the respective weight value can be decreased, e.g. can comprise 0.3 of weight values of other patterns, if the at least one pattern includes symbols indicative of neither commands with math operations nor four-byte constants.

Further, in some non-limiting embodiments of the present technology, the processor 401 can be configured to determine a frequency of occurrence of the at least one pattern within the target number array. Broadly speaking, the frequency of occurrence of the at least one pattern can be a numeric value indicating how often the at least one pattern occurs in the plurality of target software files associated with the given target software, i.e. how often an associated set of commands occurs within the given target software.

In some non-limiting embodiments of the present technology, the frequency of occurrence of the at least one pattern can be determined according to the following equation:

$$\lambda = L/K, \qquad (2)$$

where L is a frequency of occurrence of the at least one pattern within the target number array of target function identifiers associated with the given target software, and K is a number of target software files in the plurality of target software files including associated machine codes of the given target software.

As it can be appreciated, the frequency of occurrence of the at least one pattern can be less than 1 if the at least one pattern does not occur in each and every one of the plurality of target software files; and can be greater than 1 if there are several occurrences of the at least one pattern in each one of the plurality of target software files, as an example.

In some non-limiting embodiments of the present technology, the respective weight value to be assigned to the at least one pattern may be based on the frequency of occurrence thereof determined in accordance with Equation (2).

The third method 300 thus proceeds to step 380.

Step 380: Storing the at Least One Pattern with a Label Indicative of an Association Between the at Least One Pattern and the Respective Target Software for Inclusion Thereof into the Training Set of Data Further, at step 380, in some non-limiting embodiments of the present technology, the processor 401 can be configured to assign the at least one pattern with a label indicative of an association between the at least one pattern and the given target software. Thus, the processor 401 can be configured to store the at least one pattern associated with the label and the respective weight value in the training set of data used for training the classifier.

The third method 300 finally advances to step 390.

Step 390: Training the Classifier, Based on the Training Set of Data, to Determine the Affiliation of a Given Software to the Respective Target Software.

At step 390, the processor 401 can be configured to train the classifier, based on the so generated training set of data, to determine the affiliation to the given target software. It should be expressly understood that it is not limited as to how the classifier can be implemented, and in various non-limiting embodiments of the present technology, the classifier can be implemented, for example, as one of a probabilistic graph model (Random Forest) and as a SVM-classifier.

In specific non-limiting embodiments of the present technology, the processor 401 can be configured to train the classifier using one or more machine-learning techniques.

The third method 300 hence terminates.

Computing Environment

Figure 4:
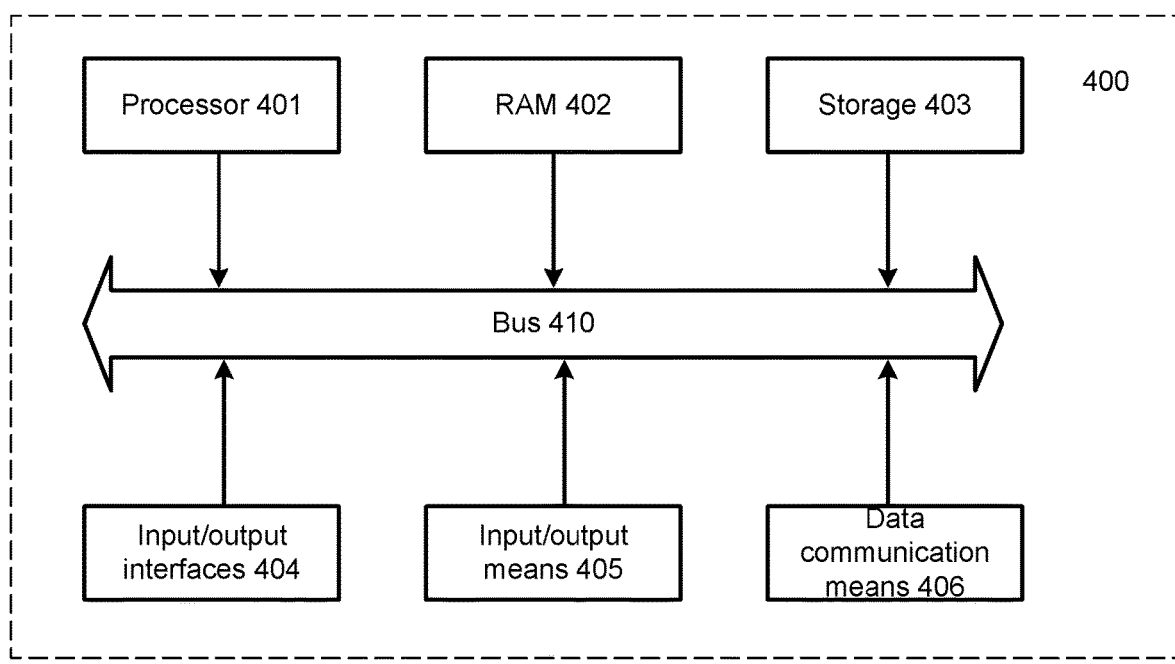
FIG. 4 depicts a schematic diagram of an example computing environment configurable for execution of one of the methods of FIGS. 1, 2, and 3, in accordance with certain non-limiting embodiments of the present technology.

With reference to FIG. 4, there is depicted an example functional diagram of the computing device 400 configurable to implement certain non-limiting embodiments of the present technology including the first method 100, the second method 200, and the third method 300 described above.

In some non-limiting embodiments of the present technology, the computing device 400 may include: the processor 401 comprising one or more central processing units (CPUs), at least one non-transitory computer-readable memory 402 (RAM), a storage 403, input/output interfaces 404, input/output means 405, data communication means 406.

According to some non-limiting embodiments of the present technology, the processor 401 may be configured to execute specific program instructions the computations as required for the computing device 400 to function properly or to ensure the functioning of one or more of its components. The processor 401 may further be configured to execute specific machine-readable instructions stored in the at least one non-transitory computer-readable memory 402, for example, those causing the computing device 400 to execute one of the first method 100, the second method 200, and the third method 300.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 402 may be implemented as RAM and contains the necessary program logic to provide the requisite functionality.

The storage 403 may be implemented as at least one of an HDD drive, an SSD drive, a RAID array, a network storage, a flash memory, an optical drive (such as CD, DVD, MD, Blu-ray), etc. The storage 403 may be configured for long-term storage of various data, e.g., the aforementioned documents with user data sets, databases with the time intervals measured for each user, user IDs, etc.

The input/output interfaces 404 may comprise various interfaces, such as at least one of USB, RS232, RJ45, LPT, COM, HDMI, PS/2, Lightning, FireWire, etc.

The input/output means 405 may include at least one of a keyboard, a joystick, a (touchscreen) display, a projector, a touchpad, a mouse, a trackball, a stylus, speakers, a microphone, and the like. A communication link between each one of the input/output means 405 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 406 may be selected based on a particular implementation of a network, to which the computing device 400 can have access, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of a WAN, a PAN, a LAN, an Intranet, the Internet, a WLAN, a WMAN, or a GSM network, as an example.

These and other components of the computing device 500 may be linked together using a common data bus 410.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for determining an affiliation of a given software to target software, the method being executable by a processor, the method comprising:
   receiving, by the processor, a file including a machine code associated with the given software;
   determining a file format of the file associated with the given software,
      the determining comprising applying a signature analysis to the file;
   identifying, by the processor, based on the file format, in the machine code of the given software, at least one function of a plurality of functions associated with the given software;
   parsing, by the processor, the at least one function to identify therein at least one function command;
   generating, by the processor, for each one of the plurality of functions associated with the given software, a respective function identifier,
      a given function identifier associated with the at least one function being generated based on each of the at least one function command;
   aggregating, by the processor, respective function identifiers of the plurality of functions associated with the given software, thereby generating an aggregated array of function identifiers associated with the given software;
   applying, by the processor, at least one classifier to the aggregated array of function identifiers to determine a likelihood parameter indicative of the given software being affiliated to a respective target software,
      the at least one classifier having been trained for determining an affiliation to the respective target software;
   in response to the likelihood parameter being equal to or greater than a predetermined likelihood parameter threshold:
      identifying the given software as being affiliated to the respective target software;
      storing data indicative of the given software in a database of affiliated software; and
      using the data indicative of the given software for further determining affiliation to the respective target software.

2. The method of claim 1, wherein, if the machine code has been processed using one of predetermined processes, the identifying the at least one function further comprises:
   executing, by the processor, the machine code associated with the given software in an isolated program environment to receive one or more memory dumps associated with the given software;
   restoring, based on the one or more memory dumps, the machine code for identifying therein the at least one function.

3. The method of claim 2, wherein one of the predetermined processes comprises one of encryption, compression, and obfuscation.

4. The method of claim 2, wherein the identifying the at least one function further comprises disassembling, by the processor, the machine code of the given software.

5. The method of claim 2, wherein the identifying the at least one function further comprises identifying, in the machine code, library functions and deleting the library functions therefrom.

6. The method of claim 2, wherein the identifying the at least one function further comprises identifying, in the machine code, machine code portions inherently non-indicative of the affiliation to the target software and deleting the machine code portions inherently non-indicative of the affiliation to the target software machine code portions from the machine code.

7. The method of claim 2, wherein the at least one function command comprises at least one action and at least one argument associated with the at least one action; and
   the generating the respective function identifier further comprises:
      applying a hash function to the at least one action and to each value of the at least one argument to generate respective hash function values, each one of the respective hash function values being a respective number sequence;
      concatenating the respective hash function values.

8. The method of claim 1, wherein the at least one classifier has been trained to determine the affiliation to the respective target software based on a training set of data, and the method further comprising generating the training set of data, the generating comprising:
   receiving, by the processor, a plurality of target software files,
      each target software file including a respective target machine code associated with the respective target software;
   determining, by the processor, for each one of the plurality of target software files, a respective target file format,
      the determining comprising applying, by the processor, a signature analysis to each of the plurality of target software files;
   identifying, by the processor, based on the respective target file format associated with a given one of the plurality of target software files, in a respective target machine code, at least one target function;
   parsing, by the processor, the at least one target function to identify therein at least one target function command;
   generating, by the processor, based on each of the at least one target function command, a respective target function identifier associated with the at least one target function, the respective target function identifier comprising an associated number sequence;
   aggregating, by the processor, associated number sequences associated with respective target functions over the plurality of target software files, thereby generating a number array associated with the respective target software;
   identifying, by the processor, in the number array associated with the respective target software, at least one pattern, wherein:
      the at least one pattern comprises a predetermined repetitive number sequence within the number array, and
      the predetermined repetitive number sequence is indicative of a frequency of occurrence of at least one associated target function command within the respective target software;

storing the at least one pattern with a label indicative of an association between the at least one pattern and the respective target software for inclusion thereof into the training set of data.

9. The method of claim 8, wherein, if the respective target machine code has been processed using one of predetermined processes, the identifying the at least one target function further comprises:
executing, by the processor, the respective target machine code associated with the respective target software in an isolated program environment to receive one or more memory dumps associated with the respective target software;
restoring, based on the one or more memory dumps, the respective target machine code for identifying therein the at least one target function.

10. The method of claim 9, wherein a length of the predetermined repetitive number sequence is determined as a constant number.

11. The method of claim 9, wherein the length of the predetermined repetitive number sequence is further determined iteratively, based on a current number thereof within the number array.

12. The method of claim 9, further comprising determining a frequency of occurrence value associated with the at least one pattern, the determining being according to the following formula:

$$\lambda = \frac{L}{K},$$

where L is a frequency of occurrence of the at least one pattern within the number array associated with the respective target software, and K is a number of machine codes in the plurality of machine codes associated with the respective target software used for generating the training set of data.

13. The method of claim 9, further comprising assigning a weight value to the at least one pattern.

14. The method of claim 9, wherein the weight value is increased if the at least one pattern is indicative of mathematical operations used within the respective target software.

15. The method of claim 14, wherein the weight value is increased if the at least one pattern is indicative of at least two four-byte constants used within the respective target software.

16. The method of claim 13, wherein the weight value is determined based on the frequency of occurrence value associated with the at least one pattern.

17. A system for determining an affiliation of a given software with target software, the system comprising a computing device, the computing device further comprising:
a processor;
a non-transitory computer-readable medium comprising instructions;
the processor, upon executing the instructions, being configured to:
receive a file including a machine code associated with the given software;
determine a file format of the file associated with the given software,
the determining comprising applying a signature analysis to the file;
identify, based on the file format, in the machine code of the given software, at least one function of a plurality of functions associated with the given software;
parse, the at least one function to identify therein at least one function command;
generate, for each one of the plurality of functions associated with the given software, a respective function identifier,
a given function identifier associated with the at least one function being generated based on each of the at least one function command;
aggregate respective function identifiers of the plurality of functions associated with the given software, thereby generating an aggregated array of function identifiers associated with the given software;
apply at least one classifier to the aggregated array of function identifiers to determine a likelihood parameter indicative of the given software being affiliated to a respective target software,
in response to the likelihood parameter being equal to or greater than a predetermined likelihood parameter threshold:
identify the given software as being affiliated to the respective target software;
store data indicative of the given software in a database of affiliated software; and
use the data indicative of the given software for further determining affiliation to the respective target software.

18. The system of claim 17, wherein, if the machine code has been processed using one of predetermined processes, the processor is further configured to:
execute, by the processor, the machine code associated with the given software in an isolated program environment to receive one or more memory dumps associated with the given software;
restore, based on the one or more memory dumps, the machine code for identifying therein the at least one function.

19. The system of claim 18, wherein one of the predetermined processes comprises one of encryption, compression, and obfuscation.

20. The system of claim 18, wherein to identify the at least one function, the processor is further configured to disassemble the machine code of the given software.

21. The system of claim 18, wherein to identify the at least one function, the processor is further configured to identify, in the machine code, library functions and delete the library functions therefrom.

22. The system of claim 18, wherein to identify the at least one function, the processor is further configured to identify, in the machine code, machine code portions inherently non-indicative of the affiliation to the target software and deleting the machine code portions inherently non-indicative of the affiliation to the target software from the machine code.

* * * * *